May 5, 1936. J. H. MARSHALL Re. 19,955

HAT BRIM PROTECTOR

Original Filed May 21, 1934

Inventor
James H. Marshall,
By Stone, Boyden & Mack,
Attorneys.

Reissued May 5, 1936

Re. 19,955

UNITED STATES PATENT OFFICE 19,955

HAT BRIM PROTECTOR

James H. Marshall, Hamlet, N. C., assignor, by direct and mesne assignments, to Francis E. Campbell, Hamlet, N. C.

Original No. 2,006,245, dated June 25, 1935, Serial No. 726,806, May 21, 1934. Application for reissue October 26, 1935, Serial No. 46,964

4 Claims. (Cl. 223—84)

The invention relates to a hat protector and more especially to a hat brim protector for soft or felt hats.

The primary object of the invention is the provision of a protector of this character, preferably made from cardboard or any other suitable sheet material and usable in an ordinary bag, so that when the hat is placed upon the device and within the bag, its brim will be protected from coming in contact with the bag when the bag is carried from one point to another, the protector being adapted for use by hat cleaning and blocking establishments and eliminating the necessity for the employment of hat boxes or other like containers which are objectionably costly.

Another object of the invention is the provision of a protector of this character, wherein the crown of the hat can be engaged therewith, so that its brim will be shielded or guarded, particularly when within a bag or the like, the protector being of novel construction and made from a single piece of cardboard or any other suitable sheet material.

A still further object of the invention is the provision of a protector of this character which is extremely simple in construction, inexpensive to manufacture, thoroughly reliable and efficient in its purpose, and when holding a hat, will prevent the deforming thereof when placed within a bag for the delivery of the hat to a customer.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
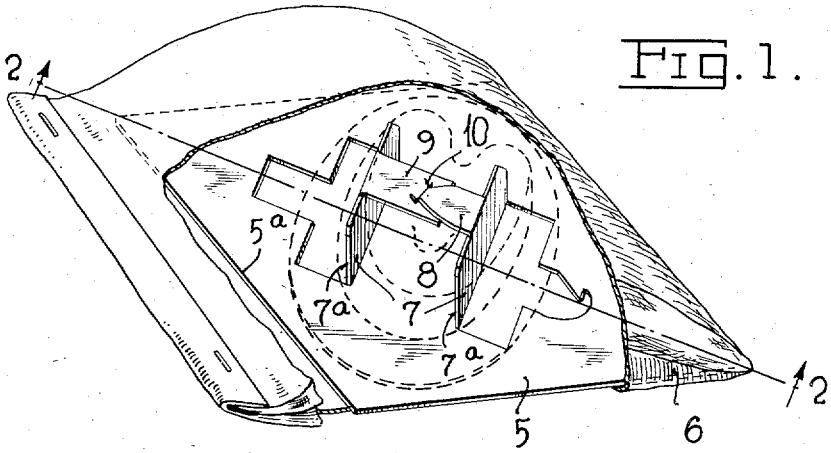
Figure 1 is a perspective view of the protector constructed in accordance with the invention and enclosed within a bag, the bag being broken away for illustrative purposes.

Referring to the drawing in detail, the protector comprises a body 5 of cardboard or other flat, relatively stiff sheet material. The body 5 is of a size to neatly fit within a container, such as a bag 6 made from paper or the like, the bag being of the conventional kind for the reception of a hat.

Figure 2:
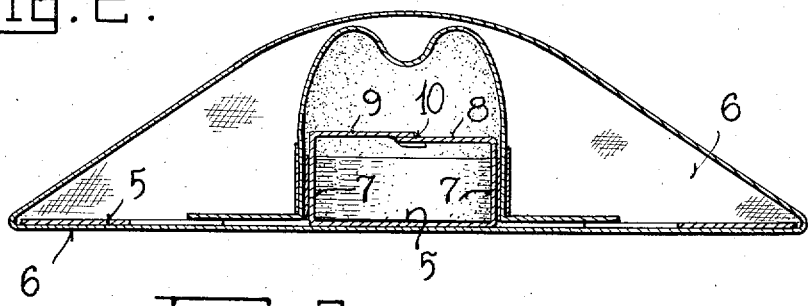
Figure 2 is a sectional view on the line 2—2 of Figure 1 looking in the direction of the arrows.
Figure 3:
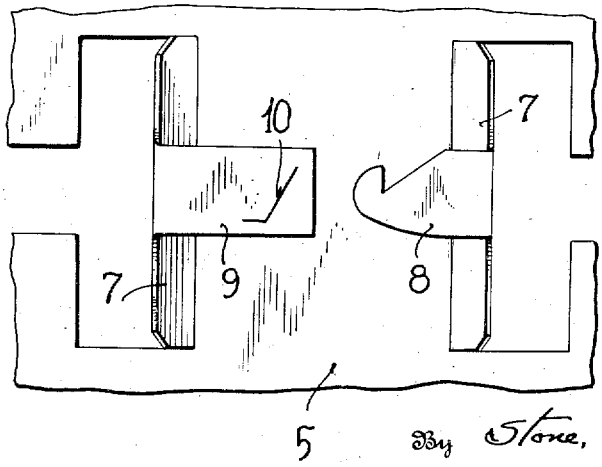
Figure 3 is a fragmentary enlarged plan view of the protector itself.

Cut out except at one side, and bent up from the body 5 about such uncut side are spaced, oppositely disposed flaps 7, these being adapted to extend at right angles to the plane of the body 5 from one face thereof. Formed with one of the flaps 7 is a hooking tongue 8, while formed with the other flap is a slotted tongue 9 having the slot 10 for the interlocking of the hooking tongue therewith. These tongues 8 and 9 are bent so as to extend toward each other, and when interlocked with each other, will hold the flaps 7 in their operative position, as shown in Figures 1 and 2 of the drawing. As will be observed by reference to the drawing, the sheet 5 is rectangular in form, and a line drawn centrally through said flaps and tongues extends diagonally of the sheet, as shown by the line 2—2, in Figure 1. Thus the tongues project toward the corners of the sheet or blank, and in this way ample space from which to cut these tongues is provided.

As will be further observed, the flaps 7 are located near the center of the body 5, and the dimensions of the body are such that the minimum distance between either end of each flap, as indicated by the character $7^a$ in Fig. 1, as well as between any point on the uncut sides of the flaps, and the adjacent outer edge of the body, as, for example, the edge $5^a$, illustrated in Fig. 1, is greater than the width of the hat brim. Furthermore, the length, height and spacing of the flaps are such that, when assembled, they form a supporting structure that fits snugly within the crown of the average size hat, but is of less height than such crown. The hat, either soft straw or felt, is placed over the upstanding flaps 7 with the brim resting upon the body 5, the brim, by virtue of the fact that it does not extend at any point to the edge of the body, being protected by the body 5 when placed within the bag 6, and kept out of contact with the bag, so that the brim will retain its proper shape either when the bag is laid upon a support or carried in the hand for the transportation of the hat to a customer.

I claim:

1. A hat protector of the character described comprising a single sheet of relatively stiff, flat material, a plurality of spaced flaps of a size approximating the interior dimensions of a hat crown cut except at one side from the sheet of material near its center, said sheet extending continuously around and beyond said flaps and said flaps being adapted to be bent up about such uncut side to extend substantially at right angles from one face of the sheet of material for snug fitting within the crown of the hat, with the hat brim resting upon the continuous sheet of material around said flaps, and tongues on said flaps adapted to be separably interlocked with each other to hold the said flaps in their upstanding position, the said flaps and sheet of material being adapted to maintain the brim and crown of the hat in shape.

2. A hat protector comprising a single sheet of relatively stiff, flat material having a plurality of spaced flaps cut except at one side therefrom near its center and bent up about such uncut side toward each other into upstanding position, said sheet extending beyond said flaps and surrounding the same and means connecting said flaps for securing them in such upstanding position to form a supporting structure adapted to fit within the crown of a hat but of less height than said crown, whereby the brim of the hat rests upon said sheet around said structure, the minimum distance between said structure and the nearest outer edge of said sheet being greater than the width of the hat brim to be protected.

3. As an article of manufacture, a hat protector blank comprising a single piece of relatively stiff sheet material, said sheet having a plurality of spaced flaps cut except on one side therefrom near its center, the uncut sides lying adjacent each other and the flaps extending away from each other and adapted to be folded about their uncut sides toward each other into upstanding position for snug fitting within the crown of the hat, and means for locking said flaps together, to hold them in position, the distance from any point on the uncut sides of said flaps to the nearest outer edge of said blank being greater than the width of the brims of the hats to be protected.

4. As an article of manufacture, a hat protector blank comprising a single rectangular piece of relatively stiff sheet material, said sheet having a pair of spaced flaps cut except on one side therefrom, locking tongues formed integral with said flaps and projecting from the free ends thereof, the uncut sides of said flaps lying substantially parallel with each other and the flaps and tongues extending away from each other, a line passing centrally through said tongues lying diagonally of said blank, whereby said tongues are directed toward the corners of the blank.

JAMES H. MARSHALL.